Feb. 12, 1935.  H. E. MARVEL  1,990,741
HOSE NOZZLE FOR DISPENSING APPARATUS
Filed Aug. 30, 1930
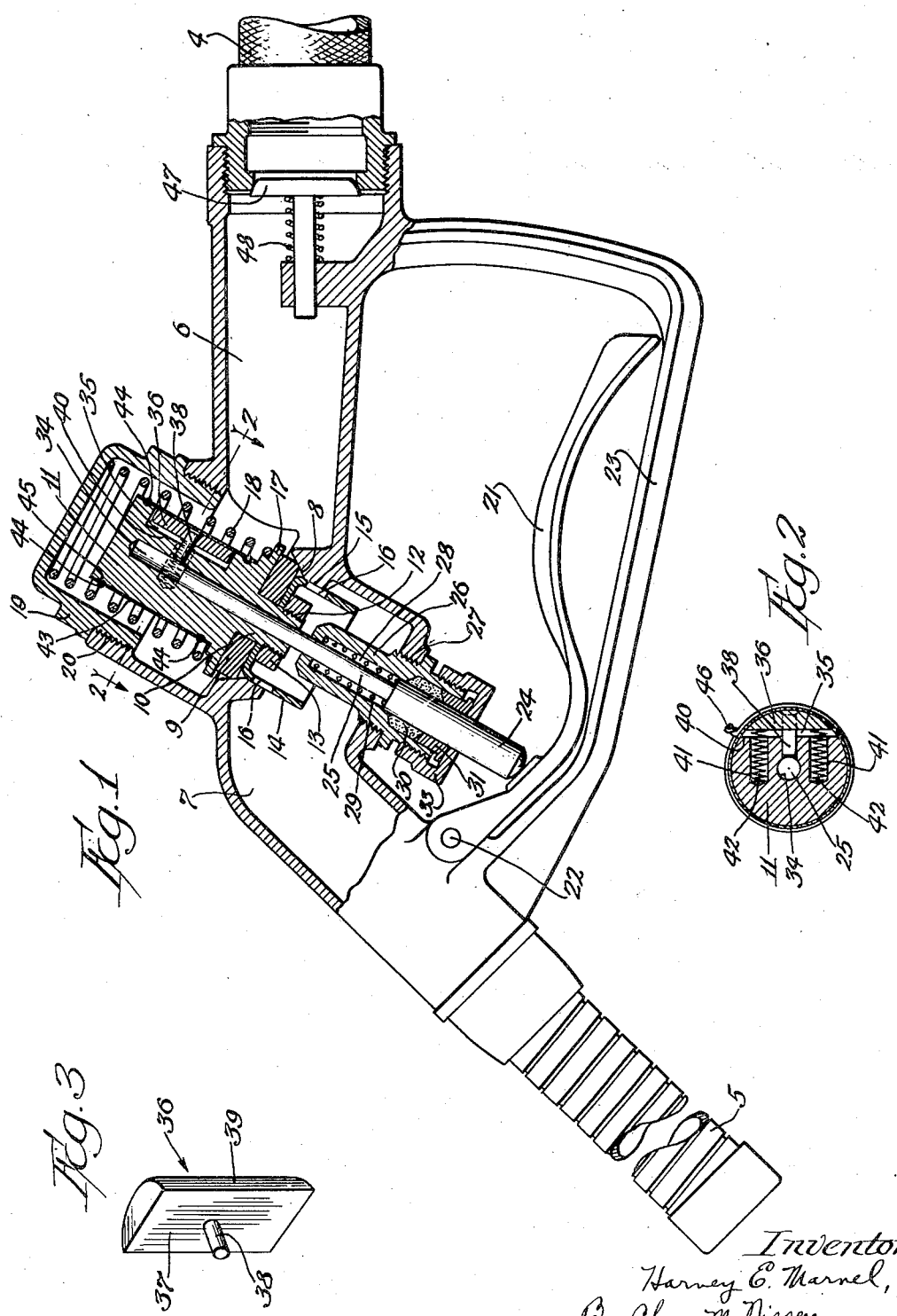
Inventor
Harvey E. Marvel,
By Chas. M. Nissen, Atty.

Patented Feb. 12, 1935

1,990,741

UNITED STATES PATENT OFFICE 1,990,741

HOSE NOZZLE FOR DISPENSING APPARATUS

Harvey E. Marvel, Fort Wayne, Ind., assignor to S. F. Bowser & Company, Inc., Fort Wayne, Ind., a corporation of Indiana Application August 30, 1930, Serial No. 478,863

6 Claims. (Cl. 137—139)

My invention relates to mechanism which is particularly adapted for use in connection with hose nozzles of dispensing apparatus, although it may have a general application, and one of the objects of the invention is the provision of improved and efficient means for preventing the flow of liquid from the nozzle when the supply pressure falls below a predetermined amount.

Another object of the invention is the provision of a valve in a conduit and means for preventing the operation thereof except when the supply pressure is above a predetermined amount.

A further object of the invention is the provision of manually operated mechanism for operating a valve in a conduit combined with means dependent upon the supply pressure for rendering operative the valve opening mechanism.

More particularly it is the object of the present invention to provide means for controlling the valve of a hose nozzle of dispensing apparatus to prevent the opening of such valve manually when the source of supply pressure is cut off.

Other objects of the invention will appear hereinafter, the novel features and combinations being set forth in the appended claims.

In the accompanying drawing—

Fig. 1 is an elevational view, mostly in section, showing my invention applied to the hose nozzle of dispensing apparatus;

Fig. 2 is a sectional view of a portion of the structure shown in Fig. 1, the section being taken on the line 2—2 looking in the direction of the arrows; and Fig. 3 is a perspective view of one of the elements shown in Figs. 1 and 2.

In Fig. 1 I have shown connected to the hose nozzle 4 the nozzle assembly comprising the flexible discharge tube 5 and the supply conduit 6 and the discharge conduit 7.

A valve seat 8 is interposed between the supply conduit 6 and the discharge conduit 7. This seat is beveled and is adapted to receive the valve disc 9 which has a hole in the center thereof to fit over the cylindrical neck 10 extending from the bottom of the poppet body 11.

The neck 10 is screw threaded at 12 to receive the nut 13. A cup-shaped guide sleeve 14 is provided with an opening at the center of its bottom to fit over the neck 10. When the nut 13 is tightened against the bottom of the cup sleeve 14, the latter, together with the valve disc 9, are clamped securely to the poppet body 11.

The cylindrical portion of the guide sleeve 14 is adapted to slide along the cylindrical walls 15 adjacent the beveled seat 8 and openings are provided at 16, 16 in the guide sleeve 14 to afford communication between the conduit 6 and the conduit 7 when the valve 9 is opened.

The poppet body 11 is provided with an annular seat 17 to receive one end of the compression spring 18, the other end of which rests against the bottom of a cup-shaped cap 19 which is screw threaded at 20 into an opening in valve body as shown.

An operating lever 21 is pivoted at 22 and is adapted to have a limited range of swinging movement within the guard 23 and between the same and the conduit 6. When the nozzle body is grasped, the operator's fingers may reach the lever 21 to press the same toward the conduit 6 for the purpose of moving rectilinearly the plunger 24 to the upper end of which is connected the valve stem 25.

A stuffing box 26 is screw threaded at 27 into an opening in the valve body. This stuffing box is provided with a chamber 28 for receiving the compression spring 29. It will be seen by referring to the drawing that the valve stem 25 is of less diameter than the diameter of the plunger 24 and therefore an annular shoulder is afforded at the upper end of the plunger to receive the lower end of the spring 29, the upper end of which contacts with the upper end of the stuffing box 26. The spring 29 is preferably so designed that when it is fully compressed, it will act as an abutment to limit the swinging movement of the lever 21 toward the conduit 6.

The plunger 24 extends through packing 30 which is held in place by the packing gland 31 and the packing nut 33.

It should be particularly understood that the valve stem 25 has a free sliding movement along the corresponding cylindrical recess 34 in the center of the poppet body 11. That is to say, the cylindrical recess 34 is closed at its upper end, but open at its lower end to receive for relatively sliding movement the valve stem 25. When the valve stem 25 is free to move along the cylindrical recess 34, the valve 9 cannot be opened and the upper end of the valve stem 25 cannot reach the upper end of the cylindrical recess 34 because the spring 29 will be fully compressed before this occurs.

The cylindrical portion of the poppet body 11 is provided with a recess 35 in the shape of a segment of a cylinder, so as to receive the compression shoe 36 which also has the shape of a segment of a cylinder. Secured to the compression shoe 36 and projecting from the center of the flat face 37 thereof is a pin 38 which fits into a radial opening in the poppet body 11. This radial opening communicates with the cylindrical recess 34, so that the pin 38 may be projected into the cylindrical recess 34 and act as an abutment to be engaged by the upper end of the valve stem 25. Since the cylindrical recess 34 is axial relative to the poppet body 11 and the valve 9 in the pin 38, being in a radial position, is at right angles to the axial line of the valve.

The length of that portion of the pin 38 which projects from the flat side 37 of the compression shoe 36 is such that it will not project into the cylindrical recess 34 when the outer curved surface 39 of the compression shoe coincides with the cylindrical surface of the poppet body 11. It will thus be seen that when the compression shoe is in its outer position, where its curved surface 39 is concentric to the curved surface of the poppet body 11, the valve stem 25 is free to slide upwardly past the pin 38 without effecting opening of the valve 9.

The flat faced bottom 40 of the recess 35 is parallel to the rear flat face 37 of the compression shoe 36, as shown in Fig. 2. Spaced apart cylindrical recesses 41, 41 are adapted to receive compression springs 42, 42. These are arranged on opposite sides of the recess 34 as shown in Fig. 2 and are also preferably parallel to the pin 38 and in a plane extending through the pin 38. The springs 42 constantly urge the shoe 36 away from the poppet body 11; that is to say, these compression springs 42 tend to always keep the space 35 open and therefore always tend to move the pin 38 to a position where it will not extend into the cylindrical recess 34.

Surrounding the cylindrical portion of the poppet body 11 is a cylinder 43 of composition such as thiokol, although any other flexible material such as leather, thin insulating fiber or thin metal suitable for the purpose may be used. The material of which the cylinder 43 is composed should be sufficiently thin and flexible to permit the pressure in the conduit 6 to act thereon to communicate such pressure to the shoe 36 and move the latter toward the flat face 40 to cause the pin 38 to be projected into the cylinder recess 34 where it will act as an abutment for the upper end of the valve stem 25. The flexible material of which the cylinder 43 is composed should also be capable of withstanding for a reasonable length of time the particular liquid being dispensed. The cylindrical compression sleeve 43 may be secured to the cylindrical portion of the poppet body 11 by means of wires 44, 44 fitting into annular recesses 45, 45 in the poppet body 11 and the ends of the wires twisted as illustrated at 46 in Fig. 2. It will thus be seen that the cylindrical compression sleeve 43 may be readily removed and renewed.

The dispensing hose 4 may be provided with a non-draining valve 47 which is held in closed position by the spring 48 so long as the pumping pressure is cut off. When this occurs the spring 48 is of sufficient strength to close the valve 47 against the head of liquid in the dispensing hose 4. In the same manner when the pumping pressure is cut off the springs 42 are of sufficient strength to move the pin 38 to its position shown in full lines in Fig. 1. Therefore, when the pumping pressure is cut off the pin 38 will be moved by the springs 42 out of the cylindrical recess 34 and the valve 9 will be automatically closed, irrespective of the position of the lever 21 and the valve stem 25.

The non-draining valve 47 may therefore be omitted because as soon as the pumping pressure is cut off the springs 42 will move pin 38 outwardly radially to effect automatic closure of the valve 9 and the latter will therefore act to prevent draining from the hose 4 when no dispensing operation is taking place. The arrangement shown is particularly adapted for the "wet hose" system of dispensing apparatus and it is desirable to keep the hose always filled with liquid up to the valve at the nozzle.

If the valve stem 25 were connected to the poppet body 11 to move bodily therewith at all times irrespective of the hydraulic pressure in the conduit 6 the operator could by opening the valve 9 and winding up the hose force the gasolene or other liquid by the pressure produced in the hose past the non-draining valve 47 and thus effect considerable draining of the gasolene or other liquid from the hose 4. One of the objects of my invention is to prevent such draining of the hose 4 because when this takes place the quantity drained from the nozzle is not registered on the meter of the dispensing apparatus and the next customer receives short measure by the amount of gasolene that has been drained from the hose in winding up the same.

It can readily be seen that if such draining of the hose were attempted, when the valve structure shown in Fig. 1 is connected to the nozzle, the valve 9 by closing toward the conduit 7, would prevent flow from the hose and the operator could not open the valve 9 because the pressure produced by winding the hose would not be sufficient to move the pin 38 into position where it would act as an abutment for the valve stem 25. That is to say, no matter how much the attendant operates the lever 21, he cannot open the valve 9 until the pumping pressure has been built up sufficiently in the conduit 6 to act on the compression sleeve 43 against the springs 42 to move the pin 38 radially inward. As stated before, the pressure produced by winding the hose would not be sufficient to move radially inward the pin 38. But even if such pressure were sufficient and the operator were able to open the valve 9 the pressure would be relieved, so that the valve 9 would automatically close and very little, if any, gasolene could be drained. There must be sufficient pumping pressure in the conduit 6 to hold the pin 38 projected radially inward and as soon as this pressure falls below a predetermined minimum, the valve 9 will automatically close.

Even when the operating lever 21 is locked in the position shown in Fig. 1 no tool of any kind can be used to move upwardly the plunger 24 to open the valve 9 because the spring 29, when fully compressed, will act as an abutment to prevent the upper end of the valve stem 25 from reaching the upper end of the cylindrical recess 34 and so long as sufficient hydraulic pressure is not present in the conduit 6, the springs 42 retain the pin 38 in its outer position where the valve stem 25 cannot engage it. The nozzle therefore cannot be tampered with to effect draining of whatever gasolene there is in the hose 4 in a wet hose dispensing outfit in an outside position at a filling station.

The claims of the present application are restricted to the nozzle construction and do not include any claims on the combination of a nozzle and the liquid dispensing line, including the meter, since the same form the subject matter of a separate application, filed by me, January 23, 1933, Serial No. 653,018.

Obviously those skilled in the art may make various changes in the details and arrangement of parts without departing from the spirit and scope of the invention as defined by the claims hereto appended and I wish therefore not to be restricted to the precise construction disclosed.

Having thus described and shown an embodiment of my invention what I desire to have protected by Letters Patent for the United States is:—

1. The combination with a discharge nozzle for dispensing apparatus, of a valve therefor, a valve stem projecting from the nozzle, a member for actuating said valve stem to open the valve, an abutment connected to said valve, means on said valve operable by fluid pressure to move said abutment into the path of said valve stem, and means for restoring said abutment when such fluid pressure is reduced below a predetermined pressure.

2. The combination with a nozzle for dispensing apparatus, of a valve therefor, a valve stem, an abutment connected to said valve, means operable by hydraulic pressure for moving said abutment into the path of said valve stem, manually operable means for shifting said valve stem and means for restoring said abutment when said pressure is reduced below a predetermined pressure.

3. In a pressure controlled nozzle for liquid dispensing apparatus, the combination with a conduit, of a valve therefor, a manually operable valve stem normally disconnected from said valve, and fluid pressure operated mechanism for connecting said valve stem to said valve.

4. In a pressure controlled nozzle, the combination with a nozzle body having a supply conduit and a discharge conduit, of a valve between said conduits, a cylindrical member connected to said valve to move bodily therewith and having a cutout portion of the shape of a segment of a cylinder, a compression shoe having the shape of a segment of a cylinder and mounted in said cutout portion for a limited movement relatively to said cylinder member, a valve stem slidable axially of said valve along the cylindrical recess in said cylindrical member, a pin projecting from the inner side of said compression shoe radially into said cylindrical recess, a flexible compression sleeve on said cylindrical member and enclosing said compression shoe, resilient means acting on the rear side of said compression shoe to move said pin out of said cylindrical recess when the operating pressure in said hose is cut off, and an operating lever for actuating said valve stem to move the same into engagement with said pin to open the said valve when the operating pressure is on.

5. In pressure controlled nozzles for dispensing apparatus, the combination with a nozzle, of a valve therefor, a valve stem movable relatively to said valve, an abutment adapted to be engaged by said valve stem when said valve is to be opened, a compression shoe connected to said abutment, resilient means for holding said abutment in inoperative position, flexible means operable by hydraulic pressure by moving said abutment into operative position, and means for actuating said valve stem into engagement with said abutment to open said valve.

6. In pressure controlled nozzles, the combination with a nozzle body having a supply conduit and a discharge conduit, of a valve between said conduits, a valve stem movable relatively to said valve, an abutment, a compression shoe for moving said abutment into the path of travel of said valve stem, fluid pressure operated mechanism acting on said shoe to move said abutment into the path of travel of said valve stem, and a lever for moving said valve stem into engagement with said abutment to effect opening of said valve.

HARVEY E. MARVEL.